(12) United States Patent
Wray et al.

(10) Patent No.: US 7,464,805 B2
(45) Date of Patent: Dec. 16, 2008

(54) SORTING STICKS FOR LOLLIPOPS

(75) Inventors: Martyn Thomas Wray, Stamford (GB); Russell Kevin Hall, Peterborough (GB)

(73) Assignee: Baker Perkins Limited, Southampton (GB)

( * ) Notice: Subject to any disclaimer, the term of this patent is extended or adjusted under 35 U.S.C. 154(b) by 1014 days.

(21) Appl. No.: 10/489,637

(22) PCT Filed: Sep. 24, 2002

(86) PCT No.: PCT/GB02/04331

§ 371 (c)(1),
(2), (4) Date: Aug. 27, 2004

(87) PCT Pub. No.: WO03/026434

PCT Pub. Date: Apr. 3, 2003

(65) Prior Publication Data

US 2004/0265434 A1 Dec. 30, 2004

(30) Foreign Application Priority Data

Sep. 25, 2001 (GB) .................................. 0122962.4

(51) Int. Cl.
*B65G 47/12* (2006.01)
(52) U.S. Cl. ...................................... 198/443; 198/773
(58) Field of Classification Search ................ 198/443, 198/773, 774.1, 775, 774.3
See application file for complete search history.

(56) References Cited

U.S. PATENT DOCUMENTS 3,038,635 A * 6/1962 Rasmusson .................. 198/443
3,246,773 A * 4/1966 Hodgkins .................... 198/443

(Continued)

FOREIGN PATENT DOCUMENTS

DE 19 824190 9/2000

(Continued)

*Primary Examiner*—James R Bidwell
(74) *Attorney, Agent, or Firm*—John P. White; Cooper & Dunham LLP

(57) ABSTRACT

An assembly and method for distributing lollipop sticks (9) from a common supply (5) to a plurality of stick holders (14), the assembly comprising an elongated conveyor chamber (3) for containing lollipop sticks as they are conveyed from the common supply to the stick holders, a plurality of stick holding channels, (14) spaced apart and leading from the base of the chamber, the conveyor chamber containing basal surfaces (11), (13) operative to move in each of two substantially opposite directions, and in use the base supporting a plurality of lollipop sticks, the basal surfaces comprising a first basal surface portion (11) and a second basal surface portion (13), the first basal surface portion (11) being obstructive to sticks in contact with the first basal surface portion as said first basal surface portion moves in a first direction away from the common supply (5), and the second basal surface portion (13) being relatively less obstructive to sticks in contact with said second basal surface portion (13) when said second basal surface portion is moved in a second direction towards the common supply, the arrangement of the assembly being such that the basal surface portions are alternately moved in the first and second directions and sticks in contact with the first basal surface portion (11) are displaced in the first direction. Advantageously, the sticks are displaced predominantly in one direction, the first direction, in a common hopper so as to feed a plurality of lollipop stick holders positioned at spaced positions along the hopper base.

9 Claims, 5 Drawing Sheets

U.S. PATENT DOCUMENTS

| | | | |
|---|---|---|---|
| 3,545,589 A * | 12/1970 | Keller | 198/443 |
| 3,575,280 A * | 4/1971 | McClary | 198/443 |
| 3,604,435 A * | 9/1971 | Day et al. | 198/774.1 |
| 3,661,240 A * | 5/1972 | Baumann | 198/773 |
| 3,907,135 A * | 9/1975 | Populin et al. | 198/443 |

FOREIGN PATENT DOCUMENTS

| | | |
|---|---|---|
| GB | 2 002625 | 2/1979 |
| GB | 2 043023 | 1/1980 |
| GB | 2 219725 | 12/1989 |

* cited by examiner

SORTING STICKS FOR LOLLIPOPS

This application is a United States National Stage Application under 35 U.S.C. §371 of International Application No. PCT/GB02/04331 filed Sep. 24, 2002, claiming priority of British Application No. 0122962.4 filed Sep. 25, 2001, the subject matter of all of which is hereby incorporated herein by reference.

The present invention relates to the manufacture of lollipops, that is to say to candies or sweetmeats made of sugar confectionery with fruit or other flavouring or fillings, (hereinafter referred to as 'sugar confectionery'), mounted on sticks.

The present invention more particularly relates to apparatus for feeding lollipop sticks to a plurality of stick holders from which the sticks may subsequently be transferred to a lollipop moulding station.

The term 'stick' is used herein to denote any elongate handle for a lollipop. A stick may be of wood lengths of polymer extrusion or rolled paper, for example.

Figure 3:
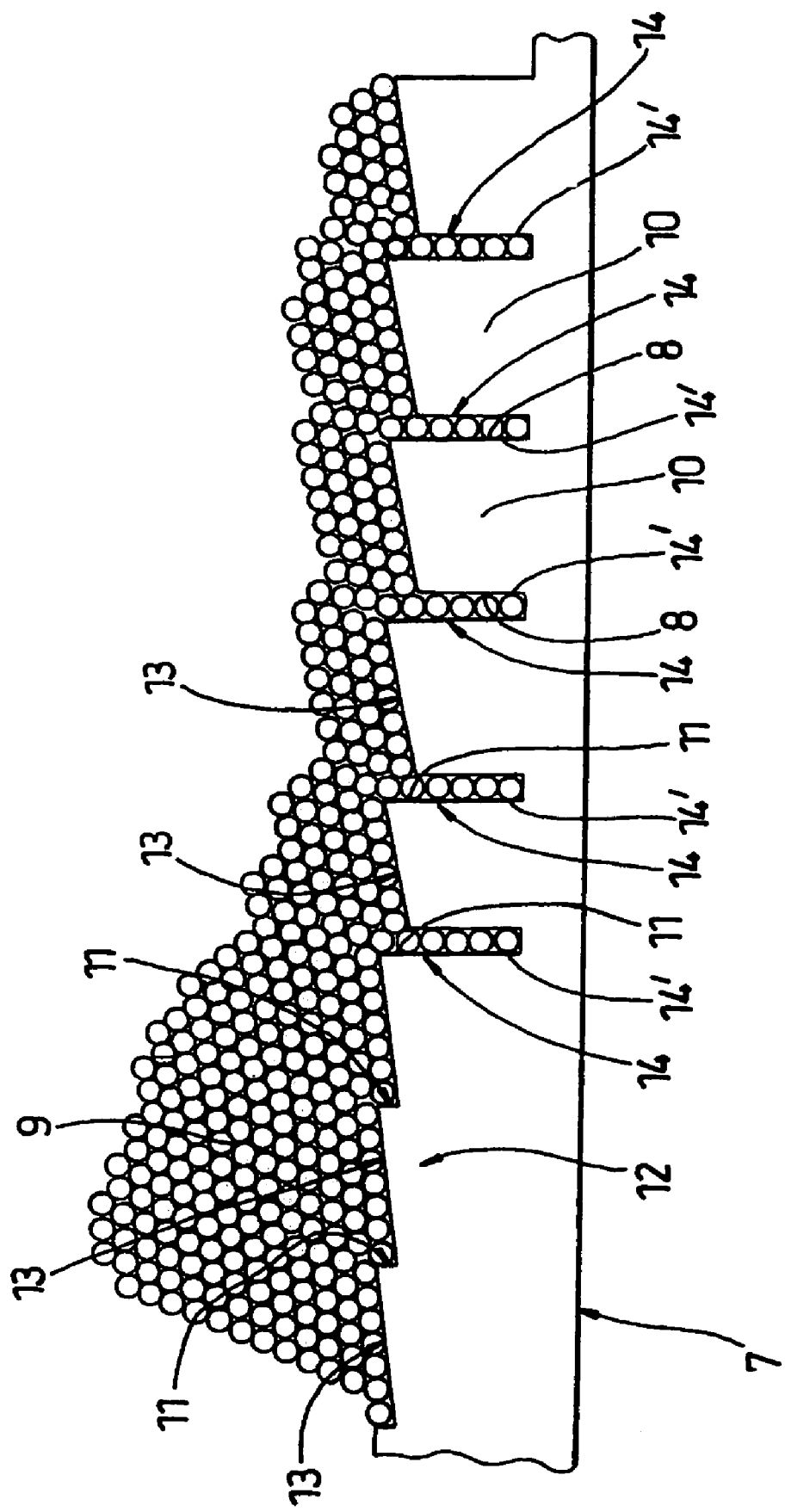

We are aware that in patent specification GB 2219725 of APV Corporation Limited, FIG. 3 thereof, a common hopper is employed to supply lollipop sticks to stick holding chambers defined in the relatively stationary base plate of the hopper, and an anti-jamming structure in the form of a grid comprising laterally-spaced bars of equilateral triangular cross-section is reciprocably mounted over the base.

The present invention is concerned with the problem of employing a common hopper to feed a plurality of lollipop stick holders, some of which may be positioned further from the hopper base than other stick holders. The invention is concerned with the provision of a conveyor chamber and mechanism for causing lollipop sticks to be conveyed along the conveying chamber to various stick holders.

According to a first aspect of the invention we provide an assembly for distributing lollipop sticks from a common supply to a plurality of stick holders, the assembly comprising an elongate conveyor chamber for containing lollipop sticks as they are conveyed to the stick feeder locations, a plurality of stick holding channels spaced apart and leading from the base of the chamber, the conveyor chamber containing basal surfaces operative to move in each of two substantially opposite directions, and in use the base supporting a plurality of lollipop sticks, the basal surfaces comprising a first basal surface portion and a second basal surface portion, the first basal surface portion being obstructive to sticks in contact with the first basal surface portion as said first basal surface portion moves in a first direction away from the common supply, and the second basal surface portion being relatively less obstructive to sticks in contact with said second basal surface portion when said second basal surface portion is moved in a second direction, the arrangement of the assembly being such that the basal surface portions are alternately moved in the first and second directions and sticks in contact with the first basal surface portion are displaced in the first direction.

Advantageously the sticks are displaced predominantly in one direction, the first direction, along the base thanks to the greater obstruction caused by the first basal surface portion as compared to the second basal surface portion.

In one embodiment the entire base of the conveyor chamber reciprocates, said stick holding channels being defined in the reciprocable base.

In another embodiment the stick holding channels are defined in a relatively stationary base plate, and said first and second basal surfaces are provided on a ladder framework which is reciprocably supported above the base plate.

Preferably the first and second basal surface portions extend laterally across the base.

The first basal surface portion may be substantially vertical and the second basal surface portion may be sloped.

The first surface portion is preferably proximal to the second surface portion, and said surface portions forming a saw-tooth profile.

The assembly preferably comprises a plurality of laterally spaced first surface portions and a plurality of laterally spaced second surface portions.

The base preferably comprises a plurality of laterally spaced upstanding formations, an upper section of each of the formations being provided with a first surface portion and a second surface portion.

The alternating movement of the basal surface portions acts to drive the sticks generally away from the end of the chamber at which the sticks enter and along the base. Feeding the sticks into the chamber from one end advantageously simplifies the feeding procedure as compared to having to ensure that sticks are deposited along the length of the base for the multiple stick-holding channels.

On a particularly wide lollipop moulding facility, more than one such lollipop distributing assembly may be employed.

Two such assemblies could be provided, the respective common supplies preferably being positioned adjacent to opposite margins of the moulding lines.

According to a second aspect of the invention there is provided an assembly which comprises a chamber for holding lollipop sticks, a base provided with a plurality of stick holding channels, the base being operative to move in either one of two substantially opposite directions, and in use the base supporting a plurality of lollipop sticks and the base further comprising a first surface portion and a second surface portion, the first surface portion being obstructive to sticks in contact with the first surface portion as said first surface portion moves in a first direction, and the second surface portion being relatively less obstructive to sticks in contact with said second surface portion when said second surface portion is moved in a second direction, and the arrangement being such that the base is alternately moved in the first and second directions and sticks in contact with the first surface portion are displaced in the first direction.

According to a third aspect of the invention there is provided a method of conveying lollipop sticks into stick-holding channels provided along the base of an assembly in accordance with the first aspect of the invention, the method comprising feeding sticks into the chamber from a position which is located towards one end of the chamber and, causing the basal surface portions to reciprocate so as to urge sticks away from that end of the chamber and along the chamber.

Figure 1:
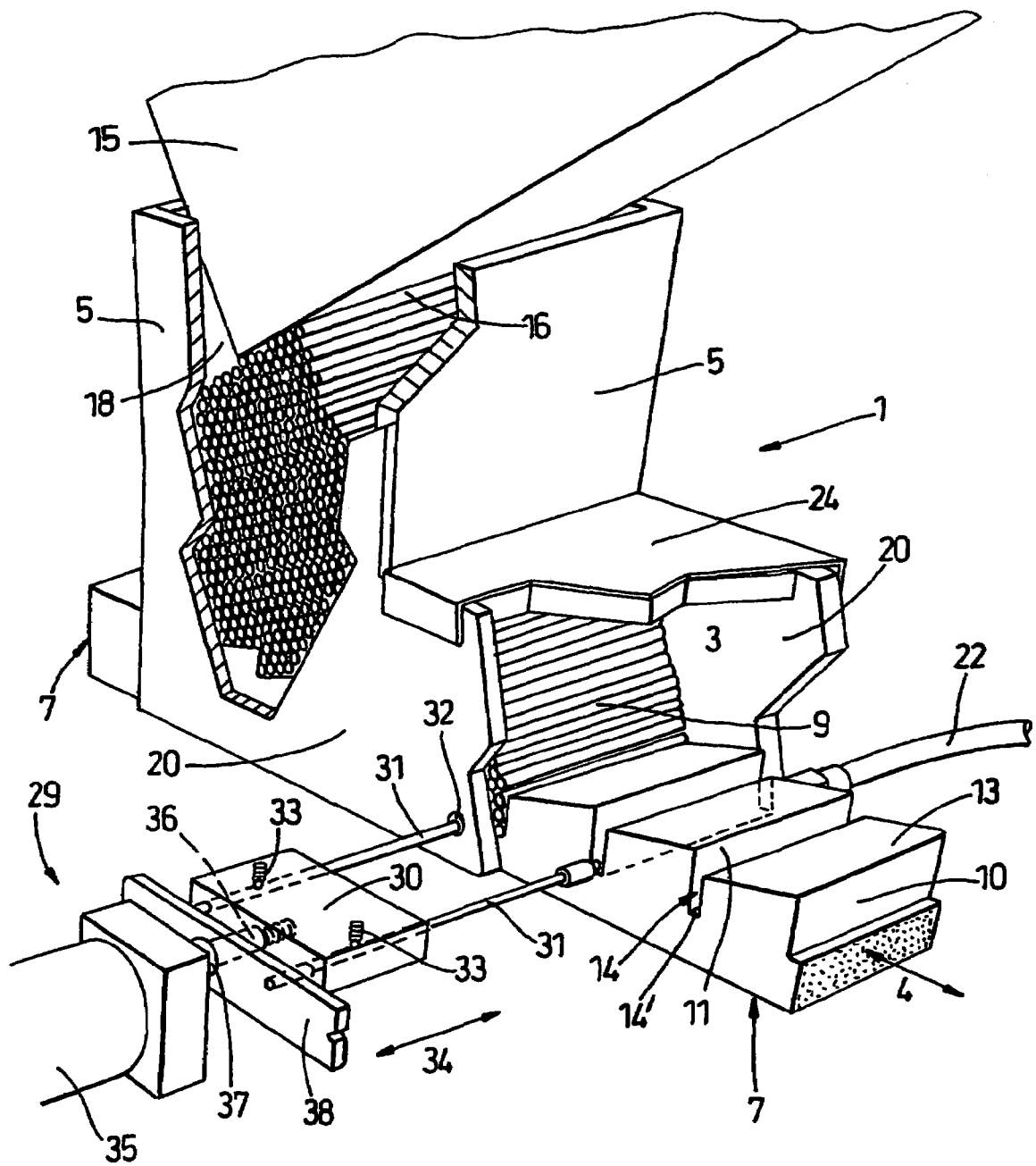
Figure 2:
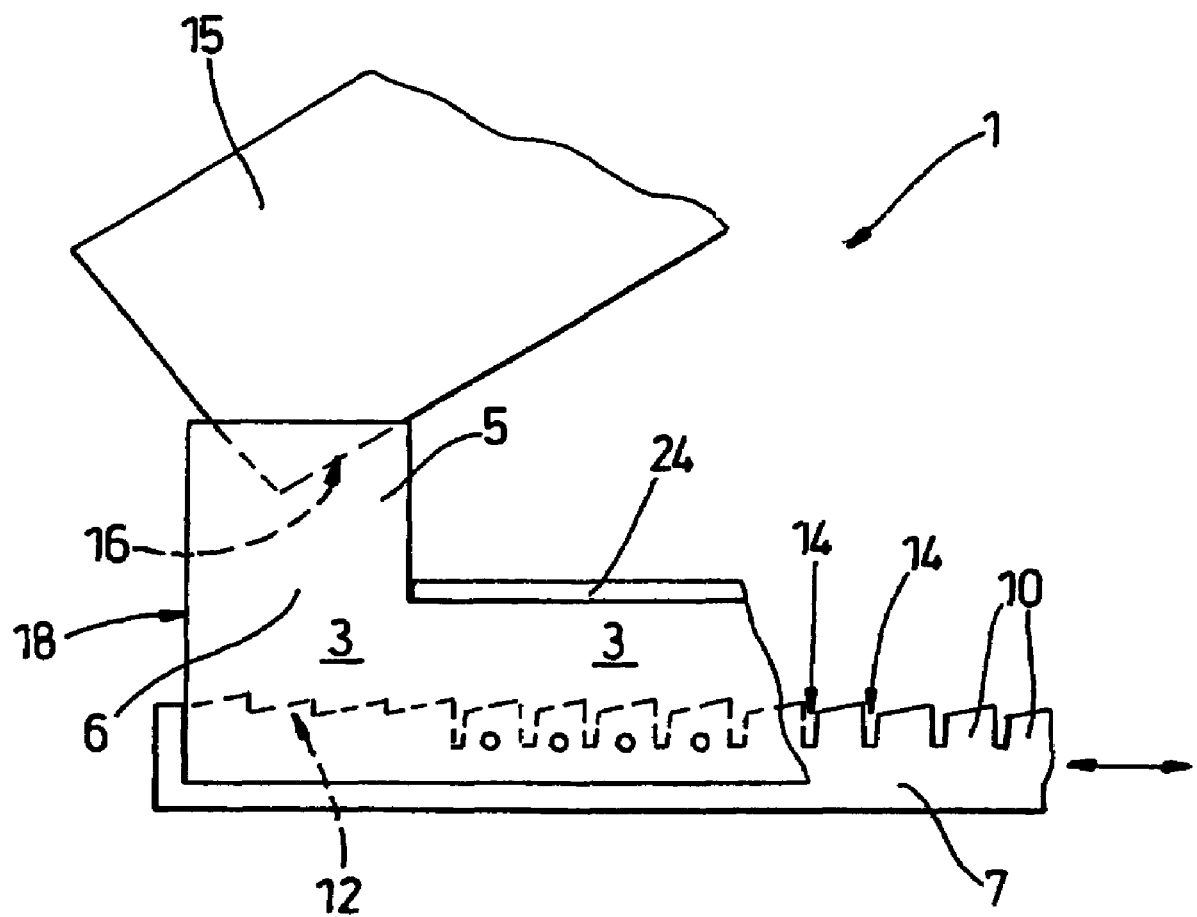
Figure 4:
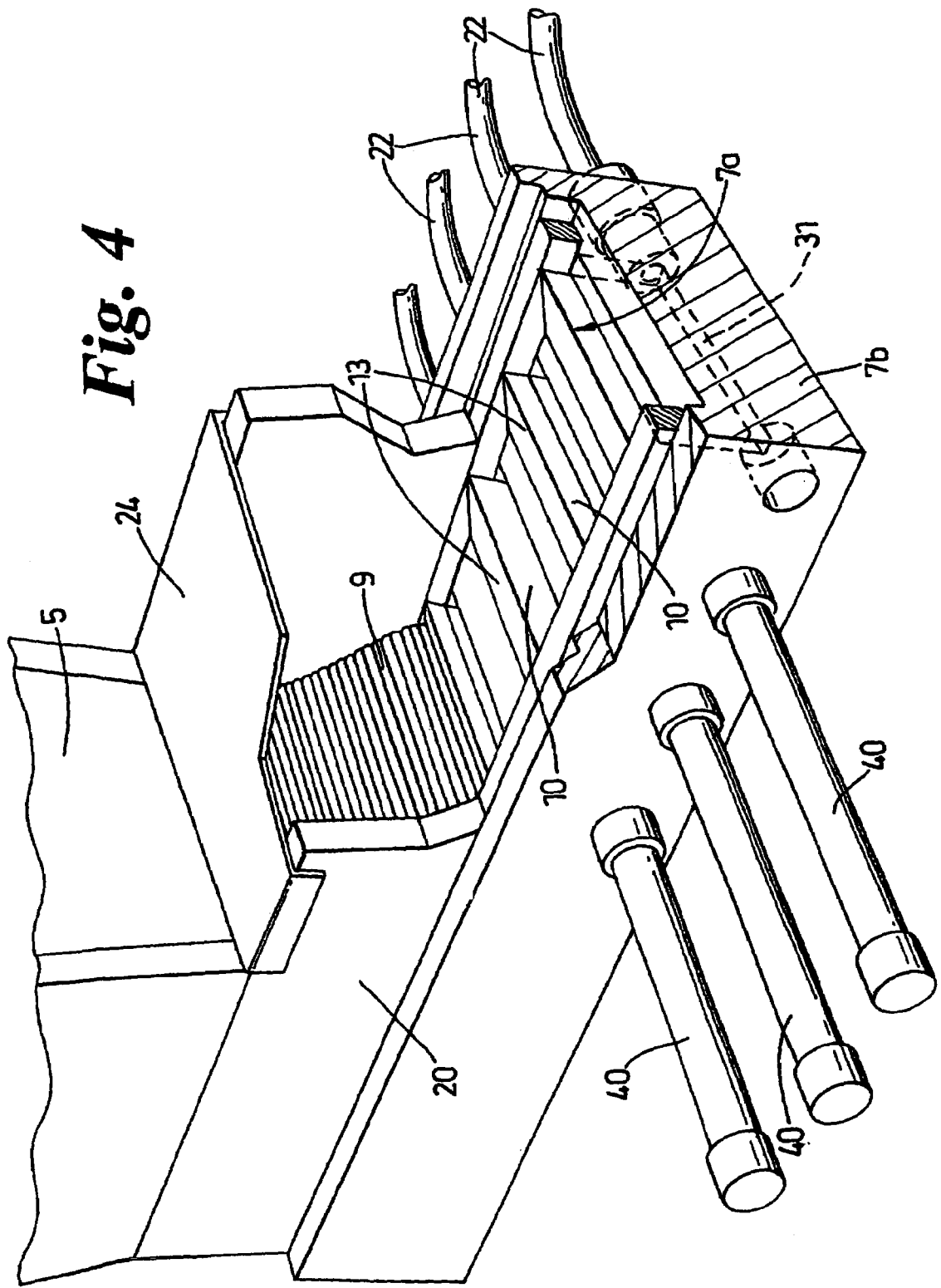
Figure 5:
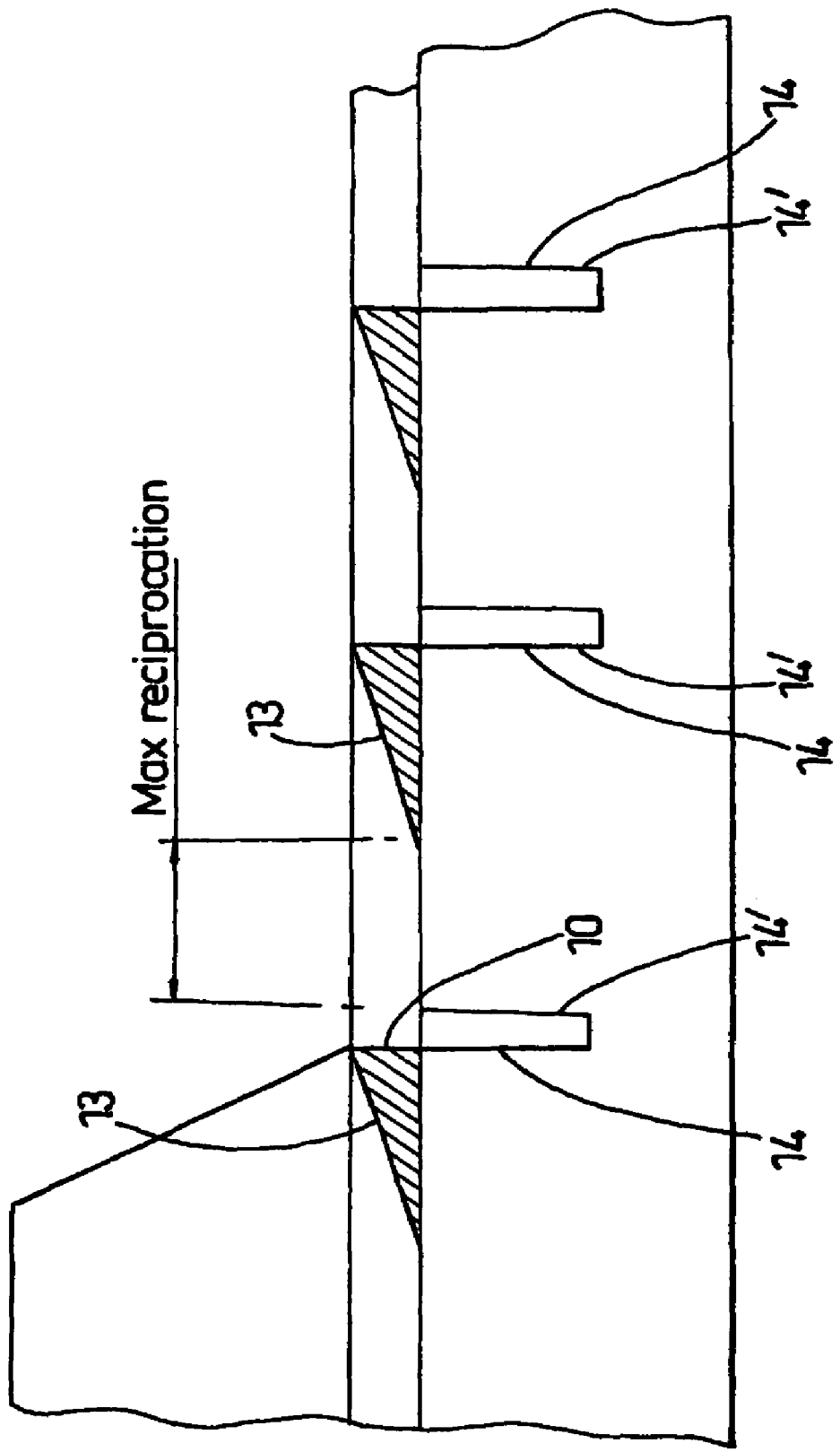

Several embodiments of the invention will now be described, by way of example only, with reference to the accompanying drawings, in which:

FIG. 1 is a partial view in perspective of an assembly in accordance with the invention, FIG. 2 is a partial side elevation of the assembly shown in FIG. 1, FIG. 3 is a side elevation of the base of the assembly shown in FIGS. 1 and 2 with a plurality of lollipop sticks supported thereon, FIG. 4 is a view similar to FIG. 1 of a modification in which base of the conveyor chamber is defined in part by a reciprocating ladder frame, and FIG. 5 is a partial schematic longitudinal cross section of the assembly of FIG. 4.

With reference to FIGS. 1 to 3 there is shown an assembly 1 for holding lollipop sticks 9 for subsequent transfer to a lollipop moulding stations (not shown).

The assembly 1 comprises an elongate lollipop conveyor chamber 3, a base 7 which is capable of reciprocal movement in the chamber 3 and a hopper 5 which allows sticks to be fed into the chamber 3.

The hopper 5 comprises four walls in an oblong-rectangular arrangement which define a space which leads to an inlet 6 of the chamber 3.

The chamber 3, which is below the hopper 5, is defined by two side walls 20, two end walls, one of which is shown in FIG. 1 and with the reference numeral 18, and a removable roof 24. For ease of illustration only part of the chamber 3 is shown in FIGS. 1 and 2.

The base 7 is a structure of generally elongate form having a width approximately equal to the length of the sticks 9 and comprising a plurality of laterally spaced formations 10 and a formation 12 provided towards one end of the base 7.

Each formation 10 comprises two substantially vertical sides 8, a vertical basal surface portion 11, and an upper inclined basal surface portion 13. The orientation of the inclined surface portion 13 is such as to slope downwards in direction towards the end wall 18.

Between adjacent formations 10 there are defined stick-holding channels 14, the width of which is sufficient as to be able to accommodate the diameter of the sticks 9. The lower ends 14' of the stick-holding channels 14 constitute stick holders from which the sticks may be ejected.

As is evident from FIGS. 1 to 3 the formations 10 can be said to have a saw-tooth profile.

The formation 12 can be thought of as a plurality of the formations 10 juxtaposed, having a similar (but unspaced) saw-tooth profile.

A stick ejector arrangement 29 which is operative to urge sticks outwards of the assembly 1 comprises a reciprocal push bar 30 which locates and guides push rods 31 aligned with the lower ends of the respective stick-holding channels 14 and disposed within bushes 32 held within the side wall 20.

The push bar 30 is provided with overload devices in the form of spring-loaded ball devices 33 which retain the push rods 31 within the bar 30 and release the same, should a push rod jam. This arrangement ensures that one lane along conduit 8 can misfeed without causing other lanes to misfeed as well.

The push bar 30 is reciprocable as indicated by the double-headed arrow 34, by actuator means 35, comprising, in this example, a pneumatic cylinder, although alternative actuator means such as electrical devices may be used.

The pneumatic cylinder 35 houses a piston 13 (not shown) having a piston rod 36 connected to the push bar 30. The piston rod 36 extends through a hole 37 formed in a stationary bar 38, which forms a stop for the push rods 31. The position of the bar 38 can be varied according to operational requirements.

The assembly 1 and stick ejector arrangement 29 operate as follows. Initially a box 15 of sticks is placed in the opening of the hopper 5. An opening 16 provided in a wall of the box 15 allows the sticks in the box to be dispensed into the hopper 5 under gravity. The box 15 then sits on the top of the hopper 5.

The sticks thus fall down through the hopper 5 to form a pile of sticks on the base 7.

The base 7 is then caused to reciprocate back and forth in the directions shown by the double-headed arrow 4. More specifically, as the base 7 moves in a direction which is generally away from the end wall 18 the vertical portions 11 of the saw-toothed formations of the formation 12 urge in that direction in the chamber 3 sticks which are in contact with the portions 11. Other sticks which will be moved in that direction being those which experience sufficient net force, either directly or indirectly, from the sticks which are in contact with the vertical portions 1, referred to as the first surface portions.

Once the base 7 has completed its maximum displacement away from the end 18, it is then caused to move back towards the end wall 18. As the base 7 moves in that reverse direction the inclined basal surfaces 13, referred to as the second basal surface portions, impart a force component to those sticks which are in contact with the second surface portions which is in the direction of movement of the base. However, due to the weight of sticks being fed into the chamber 3 through the hopper 5, the presence of the end wall 18 and the inclination of second surface portions 13, the sticks in contact with said second surface portions 13 will move a substantially negligible amount in that reverse direction of movement of the base 7. Compared to the first basal surface portions 11, the second surface portions 13 effectively present much less of an obstruction to the sticks.

The reciprocating movement of the base continues and gradually the sticks 9 are urged along the base 7 and in so doing sticks will fall into the stick holding channels 14.

The push rods 31 are actuated in synchronisation with the reciprocating motion of the base, ie the rods 31 are activated when aligned with sticks in the stick-holding channels 14. The push rods 31 are operative to urge the lowermost stick in each channel 14 into a respective conduit 22.

Thus an end to end train of lollipop sticks 3 is pushed through the conduits to a lollipop moulding station.

It will be appreciated that the flow of sticks through the chamber 3 is related to the vertical height of the chamber 3. Thus, in an alternative embodiment, there could be provided means for adjusting the height of chamber 3 as determined by the distance between the base 7 and the roof 24.

FIGS. 4 and 5 show a modification to the assembly of FIGS. 1 to 3 and like parts have been given the same reference numerals.

In the assembly of FIGS. 4 and 5, the base of the conveyor chamber is formed by a relatively stationary base plate 7b and a basal ladder framework 7a, which is slidably reciprocable on the base plate 7b. The stick-holding channels 14 are defined in the stationary base plate 7b and are, in use, fed with sticks from the hopper 5 by the reciprocating action of the ladder framework 7a, the longitudinally spaced-apart rungs of the framework 7a providing said first and second basal surface portions 13 and 10 which act in the same way as the corresponding basal surface portions in FIG. 1 to convey the sticks longitudinally of the conveyor chamber, to cause the sticks to fall into the slots 14. The slots 14 are preferably arranged to be permanently uncovered by the ladder framework by arranging the stroke of the framework accordingly.

As shown in FIG. 4, sticks can be displaced from the respective holding slots 14 by respective air cylinders 40, the pistons of which are secured to respective push rods 31, which are similar to the push rods 31 of FIG. 1.

The invention claimed is:

1. An assembly for distributing lollipop sticks (9) from a common supply (5) to a plurality of stick holders (14), the assembly comprising an elongated conveyor chamber (3) for containing lollipop sticks as they are conveyed from the common supply to the stick holders, a plurality of stick holding channels (14) spaced apart and leading from the base of the chamber, the conveyor chamber containing basal surfaces (11, 13) operative to move in each of two substantially opposite directions, and in use the base supporting a plurality of lollipop sticks, the basal surfaces comprising a first basal surface portion (11) and a second basal surface portion (13), the first basal surface portion (11) being obstructive to sticks in contact with the first basal surface portion as said first basal surface portion moves in a first direction away from the common supply (5), and the second basal surface portion (13) being relatively less obstructive to sticks in contact with said second basal surface portion (13) when said second basal surface portion is moved in a second direction towards the common supply, the arrangement of the assembly being such that the basal surface portions are alternately moved in the first and second directions and sticks in contact with the first basal surface portion (11) are displaced in the first direction.

2. An assembly according to claim 1, wherein the stick holding channels are defined in a relatively stationary base plate (7*b*), and said first and second basal surfaces are provided on a ladder framework (7*a*) which is reciprocally supported above the base plate (7*b*).

3. An assembly according to claim 1, wherein the first and second basal surface portions (11, 13) extend laterally across the base (7; 7*a*, 7*b*).

4. An assembly according to claim 1, wherein the first basal surface portion (11) is substantially vertical and the second basal surface portion is sloped (13).

5. An assembly according to claim 4, wherein each first basal surface portion is proximal to a second basal surface portion, said basal surface portions (11, 13) forming a sawtooth profile.

6. An assembly according to claim 1, wherein the base comprises a plurality of laterally spaced upstanding formations (10), an upper section of each of the formations being provided with a first surface portion (11) and a second surface portion (13).

7. An assembly according to claim 6, wherein spaces between the basal formations define laterally-extending stick-holding channels (14), which are so arranged as to reciprocate in use with the basal surface portions.

8. An assembly according to claim 1 comprising further conveying means (22, 29) adapted to convey lollipop sticks from said stick holding channels to a lollipop molding station.

9. A method of conveying lollipop sticks into stick-holding channels (14) provided in a base of an assembly according to claim 1, the method comprising feeding sticks into a chamber (3) from a position which is located towards one end of the chamber and causing said basal surface portions (11, 13) to reciprocate so as to urge sticks away from that end of the chamber and along the base.

\* \* \* \* \*